Patented Sept. 4, 1934

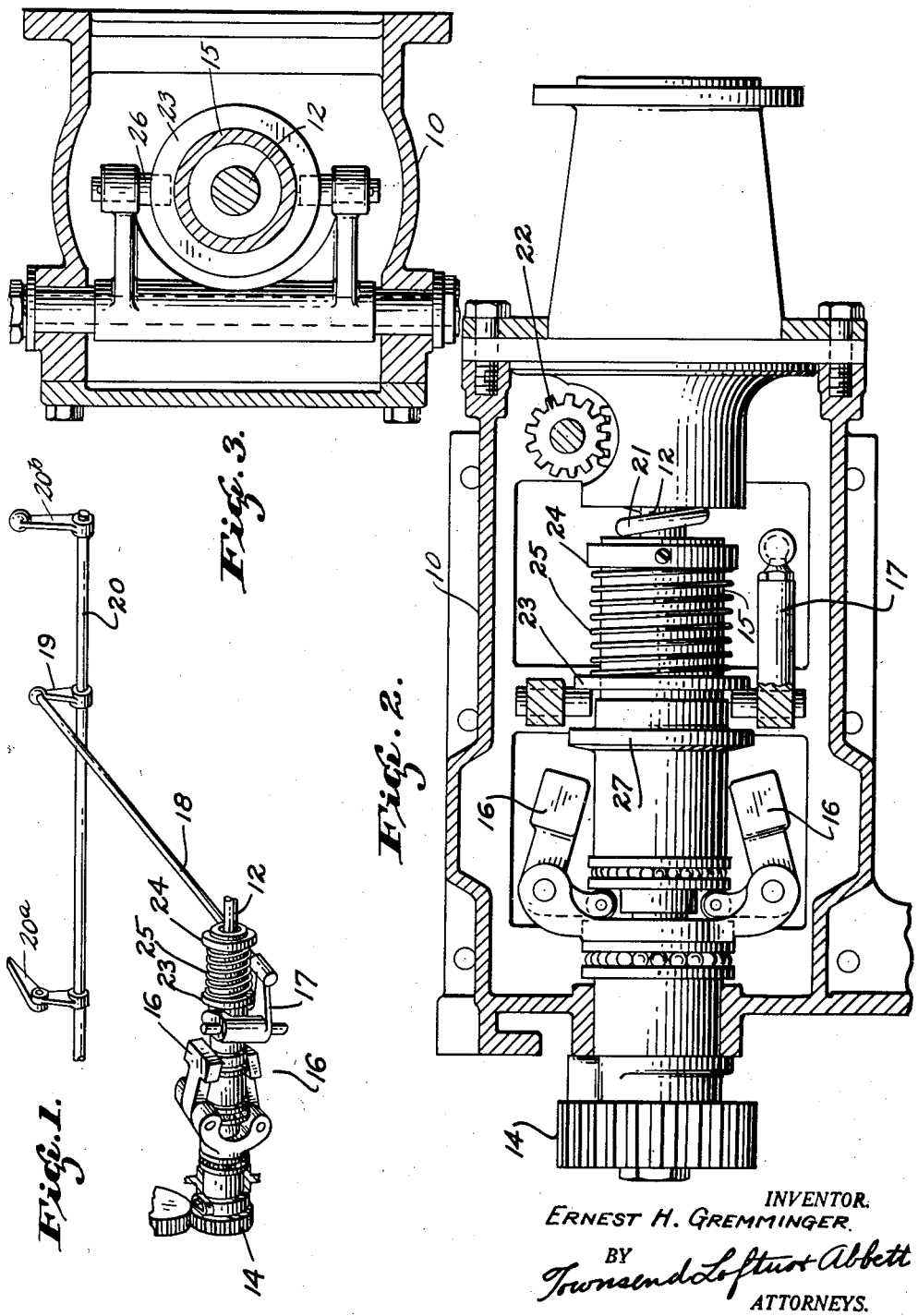

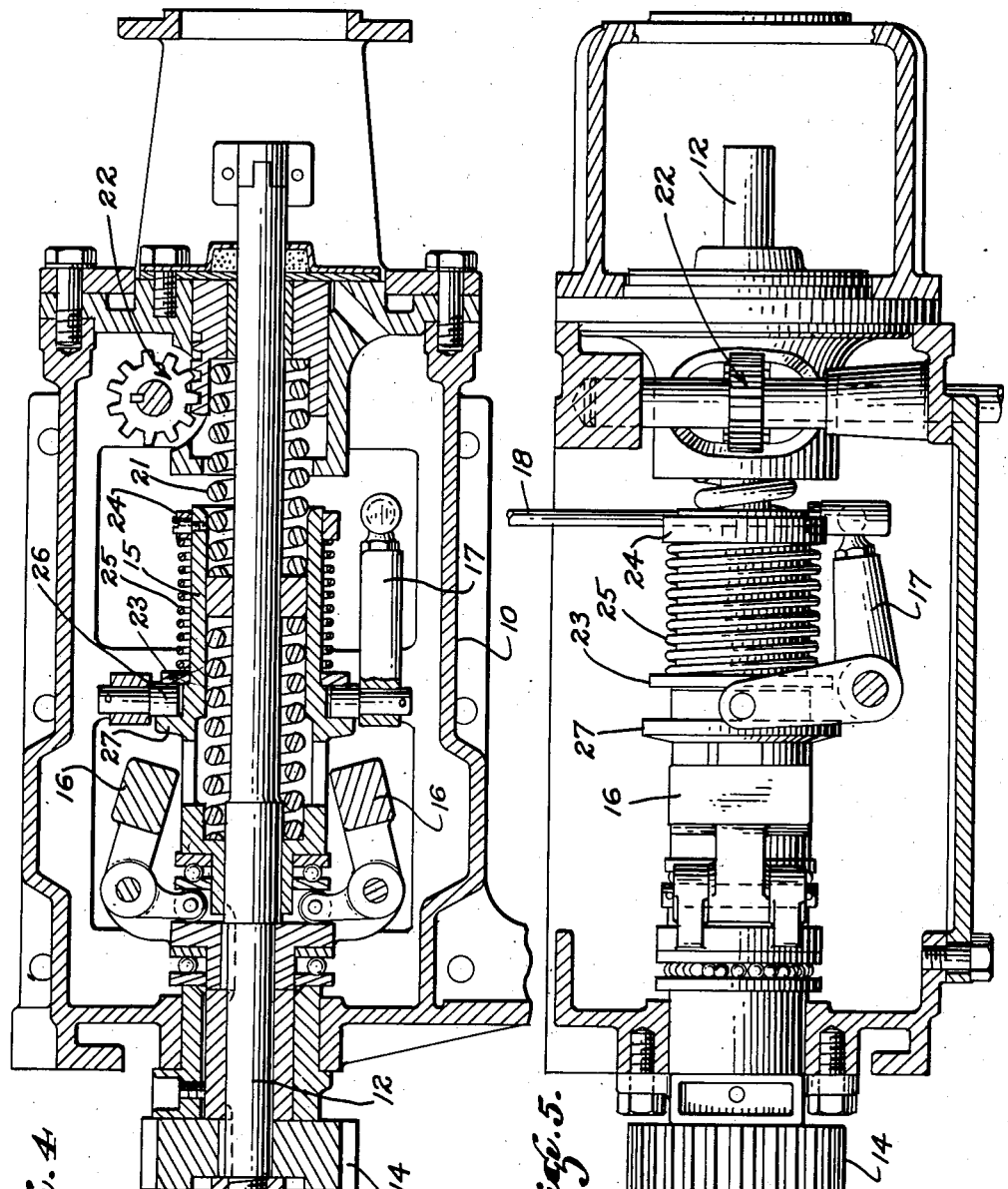

1,972,482

UNITED STATES PATENT OFFICE 1,972,482

WEDGE SHAFT CONTROL FOR DIESEL ENGINES

Ernest H. Gremminger, Alameda, Calif., assignor to Atlas Imperial Diesel Engine Company, Oakland, Calif., a corporation of Delaware Application June 9, 1931, Serial No. 543,231

4 Claims. (Cl. 264—1)

This invention relates to Diesel engines and particularly pertains to a wedge shaft control therefor.

In the conventional type of Diesel engine the governor is connected with the wedge shaft so as to control the engine speed by withdrawing and inserting the wedges. In order to withdraw the wedges to stop the engine, it is ordinarily necessary to compress the governor spring in operating the wedge shaft. Due to the fact that in governors on this type of engine the springs are comparatively heavy, considerable force must be exerted in order to overcome them to enable withdrawing of the wedges and stopping of the engine. For this reason it has been found desirable to enable the wedges to be withdrawn during the operation of the engine without the necessity of compressing the governor spring. This also relieves undue strain on the connecting parts between the governor and the wedge shaft and further eliminates the necessity of releasing the governor from a set position in order to stop or materially decrease the engine speed.

Therefore, it is the principal object of the present invention to provide an improved wedge shaft control apparatus by means of which the wedge shaft may be operated to withdraw the wedges without the necessity of compressing the governor spring.

One form which the invention may assume is exemplified in the following description and illustrated by way of example in the accompanying drawings, in which:

Fig. 1 is a fragmentary view in perspective showing the governor of a Diesel engine connected with the wedge shaft thereof, which connection embodies my invention.

Fig. 2 is a view of the engine governor with the housing thereof in section.

Fig. 3 is a transverse sectional view through the governor disclosing the connecting member between the wedge shaft and the governor sleeve.

Fig. 4 is a view similar to Fig. 2 with the exception that the governor mechanism is shown in section.

Fig. 5 is a plan view of the governor apparatus showing the connection between the governor sleeve and the wedge shaft.

Referring more particularly to the accompanying drawings, I have disclosed therein a governor control for a Diesel engine. In this control there is a connection between the governor and the wedge shaft which regulates the position of the wedges in accordance with the speed of the engine. In the drawings 10 indicates a casting or housing enclosing the governor mechanism and suitably mounted on the engine frame. Journalled in this housing is a governor shaft 12 suitably driven from the engine through the medium of a gear or sprocket 14 or in other conventional manner. Arranged concentrically about the governor shaft is the governor sleeve 15 against which the governor weights 16 act as they expand. The sleeve 15 is suitably connected through the medium of a bell crank lever 17 and a push rod 18 to a crank arm 19 on the wedge shaft 20, so that the position of the governor sleeve 15 determines the position of the wedges one of which is shown at 20a in Fig. 1. The governor weights 16 act against the sleeve as the speed of the engine increases to withdraw the wedges. The governor spring 21 acts against the sleeve 15 to move the same in the direction inserting the wedges as the speed of the engine decreases and the governor weights collapse.

The compression of the governor spring 21 may be regulated in the usual manner through appropriate mechanism here indicated at 22. This enables the governor to be set for any desired speed or load. This, however, forms no important part of the invention and will not be described in detail.

I have shown a medium herein for rendering the connection between the wedge shaft and governor sleeve ineffective under certain circumstances to enable withdrawal of the wedges without compressing the governor spring 21 or without disturbing the governor setting. To accomplish this I provide a loose collar 23 on the governor sleeve 15 and a fixed collar 24 thereon interposed between which is a light spring 25. This spring, however, is of sufficient strength to overcome any friction between the parts and the drag of the wedges, so that in normal operation of the engine, collapsing of the governor weights will be absolutely accompanied by withdrawal of the wedges.

It will be seen that the bell crank 17 is provided with a fork, the arms of which are provided with two radially inwardly projecting pins 26 which are interposed between a fixed collar 27 on the governor sleeve 15 and the loose collar 23 thereon. Normally, the engagement of these pins with the two collars mentioned is sufficient to enable axial movement of the governor sleeve 15 in either direction to transmit such motion to the bell crank fork 17 and consequently to the wedge shaft 20. However, if it is desired to withdraw the wedges as by means of a hand lever, such as illustrated at 20b in Fig. 1 without compressing the governor spring 21 or disturbing the setting of the governor, the fork may be moved in a direction moving the loose collar 23 against the action of the comparatively light spring 25. Thus, the wedge shaft 20 may be swung in a direction withdrawing the wedges without disturbing the setting of the governor or without effecting or imparting any movement to the governor sleeve 15 and consequently to the governor spring 21.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a device of the character described which comprises a governor including a sleeve and governor weights adapted to impart movement to the sleeve, and a governor spring resisting said movement, a member movable by said sleeve, and a resilient means between said member and said sleeve whereby said member may be moved independently of the governor.

2. In a control for Diesel engines, the combination with a wedge shaft and a speed sensitive governor including a reciprocating governor sleeve and governor weights, a compressible spring for actuating said sleeve and governor weights, of a collar fixed on the governor sleeve, a movable collar on the governor sleeve, a fork having portions interposed between said collars, a spring bearing against the movable collar to maintain it in operative position relative to the fork and said fixed collar, said second named spring having less resistance than said governor spring but sufficient to maintain the fork operatively connected to the sleeve between said collars during operation of the governor, a connection between the wedge shaft and said fork, said second named spring being compressible by movement of said fork longitudinally of the governor, and a lever on the wedge shaft whereby to turn the latter in one direction to effect compression of the second named spring and movement of said movable collar.

3. In a control for Diesel engines, the combination with a wedge shaft having wedges connected thereto and a speed sensitive governor including a reciprocating governor sleeve and governor weights, a compressible spring for actuating said sleeve and governor weights, of a collar fixed on the governor sleeve, a movable collar on the governor sleeve, a fork having portions interposed between said collars, spring means to act against said movable collar to maintain said fork in operative position with relation to the governor sleeve to normally effect operation of the fork by said sleeve, and means whereby to effect operation of said spring means to permit operation of the wedge shaft in a direction to withdraw the wedges independently of operation of the governor sleeve.

4. In a control for Diesel engines, the combination with a wedge shaft and a speed sensitive governor including a reciprocating governor sleeve and governor weights associated with said sleeve, a compressible governor spring for actuating said sleeve and governor weights, of a fork having a movable connection with the governor sleeve, a connection between said wedge shaft and the fork to actuate the wedge shaft upon axial movement of the governor sleeve, the connection between said fork and sleeve normally restraining said fork from movement longitudinally of the governor sleeve, said connection however enabling said fork to be forcibly moved longitudinally of the governor sleeve, and means for moving the fork longitudinally of the governor sleeve against said connection.

ERNEST H. GREMMINGER.